(12) United States Patent
Alban et al.

(10) Patent No.: US 7,363,377 B1
(45) Date of Patent: Apr. 22, 2008

(54) METHOD FOR PROTECTING THE PROGRAM ENVIRONMENT OF A MICROSOFT COMPONENT OBJECT MODEL (COM) CLIENT

(75) Inventors: Philip A. Alban, Champlin, MN (US);
Eric A. Horner, Blaine, MN (US);
John C. Horton, St. Paul, MN (US);
Neil A. Lambert, Ham Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 828 days.

(21) Appl. No.: 10/268,243

(22) Filed: Oct. 9, 2002

(51) Int. Cl.
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl. ............... 709/227; 719/315; 719/316
(58) Field of Classification Search ......... 709/203, 709/227; 719/313, 315, 316, 36
See application file for complete search history.

(56) References Cited

U.S. PATENT DOCUMENTS

| | | | | |
|---|---|---|---|---|
| 5,905,987 A * | 5/1999 | Shutt et al. | ............. | 707/103 R |
| 6,044,155 A * | 3/2000 | Thomlinson et al. | ....... | 713/155 |
| 6,173,404 B1 * | 1/2001 | Colburn et al. | ............... | 726/17 |
| 6,212,512 B1 * | 4/2001 | Barney et al. | .................. | 707/1 |
| 6,272,631 B1 * | 8/2001 | Thomlinson et al. | ....... | 713/155 |
| 6,347,342 B1 * | 2/2002 | Marcos et al. | .............. | 719/315 |
| 6,389,535 B1 * | 5/2002 | Thomlinson et al. | ....... | 713/165 |
| 6,704,779 B1 * | 3/2004 | Germscheid et al. | ....... | 709/223 |
| 6,721,722 B1 * | 4/2004 | Turba | ............................ | 707/2 |
| 6,751,604 B2 * | 6/2004 | Barney et al. | ................. | 707/1 |
| 6,751,618 B1 * | 6/2004 | Germscheid et al. | ......... | 707/10 |
| 6,772,228 B1 * | 8/2004 | Aragona | ...................... | 719/316 |
| 6,782,425 B1 * | 8/2004 | Germscheid et al. | ....... | 709/227 |
| 6,826,700 B1 * | 11/2004 | Germscheid et al. | .......... | 726/5 |
| 6,839,721 B2 * | 1/2005 | Schwols | ...................... | 707/200 |
| 6,895,539 B1 * | 5/2005 | Aragona | ...................... | 714/724 |
| 6,915,485 B1 * | 7/2005 | Lambrecht et al. | ......... | 715/734 |
| 6,996,826 B2 * | 2/2006 | Kanamori | .................... | 719/316 |
| 7,010,531 B1 * | 3/2006 | Germscheid et al. | ......... | 701/10 |
| 2001/0005846 A1 * | 6/2001 | Barney et al. | .................. | 707/1 |
| 2001/0029582 A1 * | 10/2001 | Goodman et al. | .......... | 713/193 |

(Continued)

*Primary Examiner*—William Vaughn
*Assistant Examiner*—Joseph Maniwang
(74) *Attorney, Agent, or Firm*—Charles A. Johnson; Robert Marley; Nawrocki, Rooney, & Sivertson PA

(57) ABSTRACT

An apparatus for and method of creating a standardized interface between Microsoft Component Object Model environment and a non-compatible legacy environment. The technique is equally effective for both object oriented and non-object oriented scripting protocols. The interface is scripted in the native legacy command language thereby freeing the interface developer from the need to create script in both the legacy command language and a Microsoft COM compatible language, such as Visual Basic. A determination is made upon an attempt to instantiate a COM server whether the server is local or in-process. If in-process and registered, the server is instantiated within a surrogate server to isolate the calling client from potential corruption of its memory space or copying of its sensitive data by the registered in-process server. This apparatus and method operates transparently to users and administrators, such that the client memory space and sensitive data is protected without requiring special COM server registration.

7 Claims, 18 Drawing Sheets

U.S. PATENT DOCUMENTS

| | | | |
|---|---|---|---|
| 2002/0032803 A1* | 3/2002 | Marcos et al. | 709/315 |
| 2002/0059358 A1* | 5/2002 | Kanamori | 709/107 |
| 2002/0078343 A1* | 6/2002 | Rubin et al. | 713/153 |
| 2002/0083163 A1* | 6/2002 | Collazo | 709/223 |
| 2002/0095416 A1* | 7/2002 | Schwols | 707/10 |
| 2002/0174262 A1* | 11/2002 | Marcos et al. | 709/315 |
| 2002/0194090 A1* | 12/2002 | Gagnon et al. | 705/27 |
| 2003/0047044 A1* | 3/2003 | Porchia et al. | 83/13 |
| 2003/0050936 A1* | 3/2003 | Wainwright | 707/104.1 |
| 2003/0225870 A1* | 12/2003 | Sandadi et al. | 709/223 |

* cited by examiner

@CCC[.lab] prog-id vch [vmsg] . COM Client Create Instance lab       label to go to if component cannot be instantiated prog-id       programmatic identifier (name) of the component to be instantiated vch       variable to receive the instance handle (must be integer type)

vmsg       variable to capture COM-related error status if operation fails

FIG. 12

@CCI[.lab] vch.method dt arg [rtn vmsg] . COM Client Invoke Method lab      label to go to if operation fails vch      variable containing handle of component instance whose method is to be invoked method      name of method to be invoked dt      comma-separated list indicating the data types of the method arguments arg      comma-sparated list of method arguments. The number of arguments specified must exactly match the number of items in the dt field rtn      variable or report to receive the formal method return value vmsg      variable to capture COM-related error status

FIG. 13

@CCG.[lab] vch.property rtn [vmsg] . COM Client Get Property Value

| | |
|---|---|
| lab | label to go to if operation fails |
| vch | variable containing component handle |
| property | component property name |
| rtn | variable or report to receive the property value |
| vmsg | variable to capture COM-related error message text if operation fails |

FIG. 14

@CCP.[lab] vch.property dt value [vmsg] . COM Client Put (Set) Property Value lab      label to go to if operation fails vch      variable containing component handle property      component property name dt      property data type value      variable or report that contains the property value vmsg      variable to capture COM-related error message text if operation fails

FIG. 15

@CCR.vch [,vmsg] . COM Client Release Instance(s)

vch    comma-separated list of variables containing the instance handles to be released vmsg    variable to capture COM-related error message text if operation fails

FIG. 16

METHOD FOR PROTECTING THE PROGRAM ENVIRONMENT OF A MICROSOFT COMPONENT OBJECT MODEL (COM) CLIENT

CROSS REFERENCE TO CO-PENDING APPLICATIONS

U.S. patent application Ser. No. 10/268,297, filed Oct. 9, 2002, and entitled, "Generalized Textual Method for Representing Microsoft Component Object Model (COM) Server Names, Properties, Data Types, and Values in Non-Object Oriented Scripting Languages"; are commonly assigned co-pending applications incorporated herein by reference.

BACKGROUND OF THE INVENTION

1. Field of the Invention

The present invention generally relates to data base management systems and more particularly relates to enhancements for protecting access to various components by scripted legacy data base management systems via the Internet.

2. Description of the Prior Art

Legacy data base management systems are well known in the data processing art. A data base management system is termed "legacy" because its non-object oriented basic design and implementation predate the various current design and protocol standards which permit integration with other more modern object oriented systems. Such commercial legacy systems have been in general use for more than 20 years. One of the most successful legacy data base management systems is available from Unisys Business Information Systems (BIS) and is called the Classic MAPPER☐ data base management system. The Classic MAPPER system can be reviewed using the Classic MAPPER User's Guide which may be obtained from Unisys Corporation.

The Classic MAPPER system, which runs on proprietary hardware also available from Unisys Corporation, provides a way for clients to partition data bases into structures called filing cabinets and drawers, as a way to offer a more tangible format. The MAPPER data base manager utilizes various predefined high-level instructions whereby the data base user may manipulate the data base to generate human-readable data presentations called "reports". The user is permitted to prepare lists of the various predefined high-level instructions into data base manager programs called "MAPPER Runs". Thus, users of the Classic MAPPER system may create, modify, and add to a given data base and also generate periodic and aperiodic reports using various MAPPER Runs.

However, with the Classic MAPPER system, as well as with similar legacy data base management systems, the user must interface with the data base using a terminal coupled directly to the legacy system and must access and manipulate the data using the MAPPER Run command language of Classic MAPPER. Ordinarily, that means that the user must either be co-located with the hardware which hosts the data base management system or must be coupled to that hardware through dedicated telephone, satellite, or other data links. Furthermore, the user usually needs to be schooled in the scripted command language of Classic MAPPER (or other legacy data base management system) to be capable of generating MAPPER Runs.

Since the advent of large scale, dedicated, legacy data base management systems, the Internet or world wide web has come into being. Unlike closed legacy data base management systems, the Internet has become a world wide bulletin board, permitting all to achieve nearly equal access using a wide variety of hardware, software, and communication protocols. Even though some standardization has developed (e.g., object oriented script), one of the important characteristics of the world wide web is its ability to constantly accept new and emerging techniques within a global framework. Many current users of the Internet have utilized several generations of hardware and software from a wide variety of suppliers from all over the world. It is not uncommon for current day young children to have ready access to the world wide web and to have substantial experience in data access using the Internet.

Thus, the major advantage of the Internet is its universality. Nearly anyone, anywhere can become a user. That means that virtually all persons are potentially Internet users without the need for specialized training and/or proprietary hardware and software. One can readily see that providing access to a legacy data base management system, such as Classic MAPPER, through the Internet would yield an extremely inexpensive and universally available means for accessing the data which it contains and such access would be without the need for considerable specialized training.

There are several basic problems with permitting Internet access to a proprietary legacy data base. The first is a matter of security. Because the Internet is basically a means to publish information, great care must be taken to avoid intentional or inadvertent access to certain data by unauthorized Internet users. In practice this is substantially complicated by the need to provide various levels of authorization to Internet users to take full advantage of the technique. For example, one might have a first level involving no special security features available to any Internet user. A second level might be for specific customers, whereas a third level might be authorized only for employees. One or more fourth levels of security might be available for officers or others having specialized data access needs.

Existing data base managers have security systems, of course. However, because of the physical security with a legacy system, a certain degree of security is inherent in the limited access. On the other hand, access via the Internet is virtually unlimited which makes the security issue much more acute.

The second major problem is imposed by the Internet protocol itself. One of the characteristics of the Internet which makes it so universal is that any single transaction in HTML language combines a single transfer (or request) from a user coupled with a single response from the Internet server. In general, there is no means for linking multiple transfers (or requests) and multiple responses. In this manner, the Internet utilizes a transaction model which may be referred to as "stateless". This limitation ensures that the Internet, its users, and its servers remain sufficiently independent during operation that no one entity or group of entities can unduly delay or "hang-up" the communications system or any of its major components. Each transmissions results in a termination of the transaction. Thus, there is no general purpose means to link data from one Internet transaction to another, even though in certain specialized applications limited amounts of data may be coupled using "cookies" or via attaching data to a specific HTML screen.

However, some of the most powerful data base management functions or services of necessity rely on coupling data from one transaction to another in dialog fashion. In fact this linking is of the essence of MAPPER Runs which assume change of state from one command language statement to the next. True statelessness from a first MAPPER command to the next or subsequent MAPPER command would preclude much of the power of Classic MAPPER (or any other legacy data base management system) as a data base management tool and would eliminate data base management as we now know it.

A third problem is the basic integration of the Microsoft Component Object Model (COM) scripting with non-object oriented legacy data processing system scripting languages. The principal means of solving this problem in the past involved invoking a separate application from within the script. Most scripting languages provide a means to execute an external program in the native Operating System (OS) environment in which the scripting engine runs.

For example, the script can synchronously execute a Windows console application or command file. This application would need to be developed using Microsoft development tools and a Microsoft programming language (e.g., Visual Basic) that is supported by Microsoft Corporation. This application would then function as an intermediary between the non-Microsoft scripting environment and the COM server. Overall, this broadens the required skills set of the developers, as they must be proficient not only in the non-Microsoft scripting language (i.e., scripting language of the legacy data base management system such as MAPPER), but the Microsoft language and tools required to build the proxy, as well. In general, this makes implementation of a generic COM client (i.e., one that allows usage of an arbitrary COM server) impractical.

Perhaps the greatest difficulty involved in client calls to COM servers concerns protecting the instantiating client against problems created by the instantiated COM server. Though instantiation of generic in-process servers tends to be more efficient, the problem is most acute, because of the lack of control of the server by the client. Typically, the client needs to be protected from corruption of its memory spaces and copying of sensitive information.

These risks may be manageable if the client application developer also is the developer of the in-process server(s) used by the client. If this is the case, at least the developer may debug the COM server to correct the problem in a timely manner. However, if, as is often the case, the client uses third party COM servers, the risk in using in-process servers is substantial. In these scenarios, the COM client developer has little control over the resolution of a COM server defect. This situation is almost impossible to effectively mange in the case where the client implements a generic COM client interface. The COM client software developer literally has no control over what COM servers are instantiated by the client, nor does he/she even know what servers are available to be instantiated at run time.

A case in point of this later scenario exists in a preferred embodiment of the present invention, Unisys Business Information Server (BIS) utilizing the Cool ICE system. The product implements a generic COM client interface in its proprietary scripting engine as explained in detail below. The product is sold to customers, who install it on their server(s) and then write script applications to suit their organizational needs. The Unisys Corporation product developers have no control or knowledge of what COM server(s) their customers will choose to incorporate into their BIS script-based applications. If the integrity of even one target COM server is questionable, it can result in serious support consequences in terms of financial cost, lost productivity, compromised sensitive data, and customer dissatisfaction.

SUMMARY OF THE INVENTION

The present invention overcomes the disadvantages of the prior art by providing a method of and apparatus for protecting the program environment of a Microsoft Component Object Model client when the client implements a generic client interface in COM servers. Any such product cannot, by definition have any knowledge of or control of the software quality of a target COM server that it will be required to instantiate. Most often, this situation is found in programs that implement a scripting engine. The script language that it uses does not matter. It may be a proprietary one or any of a number of "industry standard" languages such as JavaScript of Perl. Such programs allow customers (users) to create their own applications in the form of scripts. The developers of the scripting engine cannot by definition know at the time the engine is developed, what COM serve their users will attempt to instantiate in their script applications.

The scripting engine program, which itself may incorporate internal databases and other sensitive information, is very vulnerable to defective or malicious COM servers. This invention insures that software defects, incompatibilities, and malicious content in a target COM server cannot corrupt the client program environment. This is accomplished by selectively instantiating a target component in a surrogate process, effectively isolating it from client program environment. While providing this protection, the technique also attempts to minimize the number of additional processes created in the operating system, thus conserving system resources.

The preferred mode of practicing the present invention is within the Cool ICE system available from Unisys Corporation. It is a product which combines the full features of a legacy data base management system with true "open system" Internet access.

To make access to any legacy data base by Internet users practical, a sophisticated security system is required to prevent intentional or inadvertent unauthorized accesses. As discussed above, such a security system should provide multiple levels of access to accommodate a variety of authorized user categories. In the preferred embodiment of the present invention, several levels of data classification are provided and several classes of users are defined. This permits certain levels of data to be accessed by one or more of the several classes of user. The security system may either reside in the web server containing the gateway or may be an existing component of the data base management system.

Whereas the gateway and the security system are the minimum necessary to permit the most rudimentary form of communication between the Internet terminal of the user and the proprietary data base management system, as explained above, the Internet is a "stateless" communication system; the addition of the gateway and the security system do not change this statelessness. To unleash the real power of the legacy data base management system, the communication protocol between the data base and the user requires functional interaction between the various data transfers.

The preferred mode of practicing the present invention adds state management to this environment. Instead of considering each transfer from the Internet user coupled with the corresponding server response as an isolated transaction event as defined by the world wide web, one or more related service requests may be functionally associated in a service request sequence as defined by the legacy data base management system into a dialog.

A repository is established to store the state of the service request sequence. As such, the repository can store intermediate requests and responses, as well as other data associated with the service request sequence. Thus, the repository buffers commands, data, and intermediate products utilized in formatting subsequent data base management service requests and in formatting subsequent HTML pages to be displayed to the user.

The transaction data in HTML format received by the server from the user, along with the state information stored in the repository, are processed by a service handler into a sequence of service requests in the command language of the legacy database management system. Sequencing and control of the legacy data base management system is via an administration module.

Through the use of the repository to store the state of the service request sequence, the service handler to generate legacy data base management command language, and the administration module, the world wide web user is capable of performing each and every data base management function available to any user, including a user from a proprietary terminal having a dedicated communication link which is co-located with the proprietary data base management system hardware and software. In addition, the data base management system user at the world wide web terminal is able to accomplish this in the HTML protocol, without extensive training concerning the command language of the data base management system.

Having established the basic environment for modifying the legacy data base management system (e.g., Classic MAPPER) to provide Internet access, in order to function as a viable COM client, the legacy script language syntax must allow the script (or application) developer to perform the following: 1) create instance; 2) invoke method; 3) set property value; 4) get property value; and 5) release (or destroy) instance. The most problematic issue associated with implementing a generic COM client in a non-Microsoft scripting language has to do with the way Microsoft defines the data types of method arguments, method formal return values, and properties. It uses a special type of variable called a "variant" which is a chameleon type. That is, its data type is set programmatically, and can be redefined. While this is useful, the variant data type is generally found only in Microsoft programming languages. Therefore, there is an inherent difficulty in translating data values in the non-Microsoft scripting language, to/from the correct variant data type that the COM server deals with. COM server method arguments also have a "direction" associated with them. That is, an argument is defined as taking a value (from the client), returning a value (to the client), or both. These matters are dealt with in a novel fashion as discussed in detail below.

In the present invention, those COM servers which are instantiated may be either "local servers" or "in-process servers". A local server or "EXE" poses little risk to the calling client. Relative to the client, it is executed in a separate process. Typically this will be on the same host server as the client. However it may, based on its registration, be instantiated on a different machine using the Distributed Component Object Model (DCOM). The servers requiring the special attention are the in-process servers or "DLL". These are implemented as a dynamic link library (DLL). Relative to the client, they execute within the same process. This is the most common implementation of COM servers. In accordance with the present invention, the in-process servers are always instantiated within a COM surrogate process to isolate them from the client.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 12 is a table showing the format for client create instance;

FIG. 13 is a table showing the format for client invoke method;

FIG. 14 is a table showing the format for client get property value;

FIG. 15 is a table showing the format for client set property value;

FIG. 16 is a table showing the format for client release instance;

DETAILED DESCRIPTION OF THE PREFERRED EMBODIMENTS

The present invention is described in accordance with several preferred embodiments which are to be viewed as illustrative without being limiting. These several preferred embodiments are based upon Series 2200 hardware and operating systems, the Classic MAPPER data base management system, and the Cool ICE software components, all available from Unisys Corporation.

Figure 1:
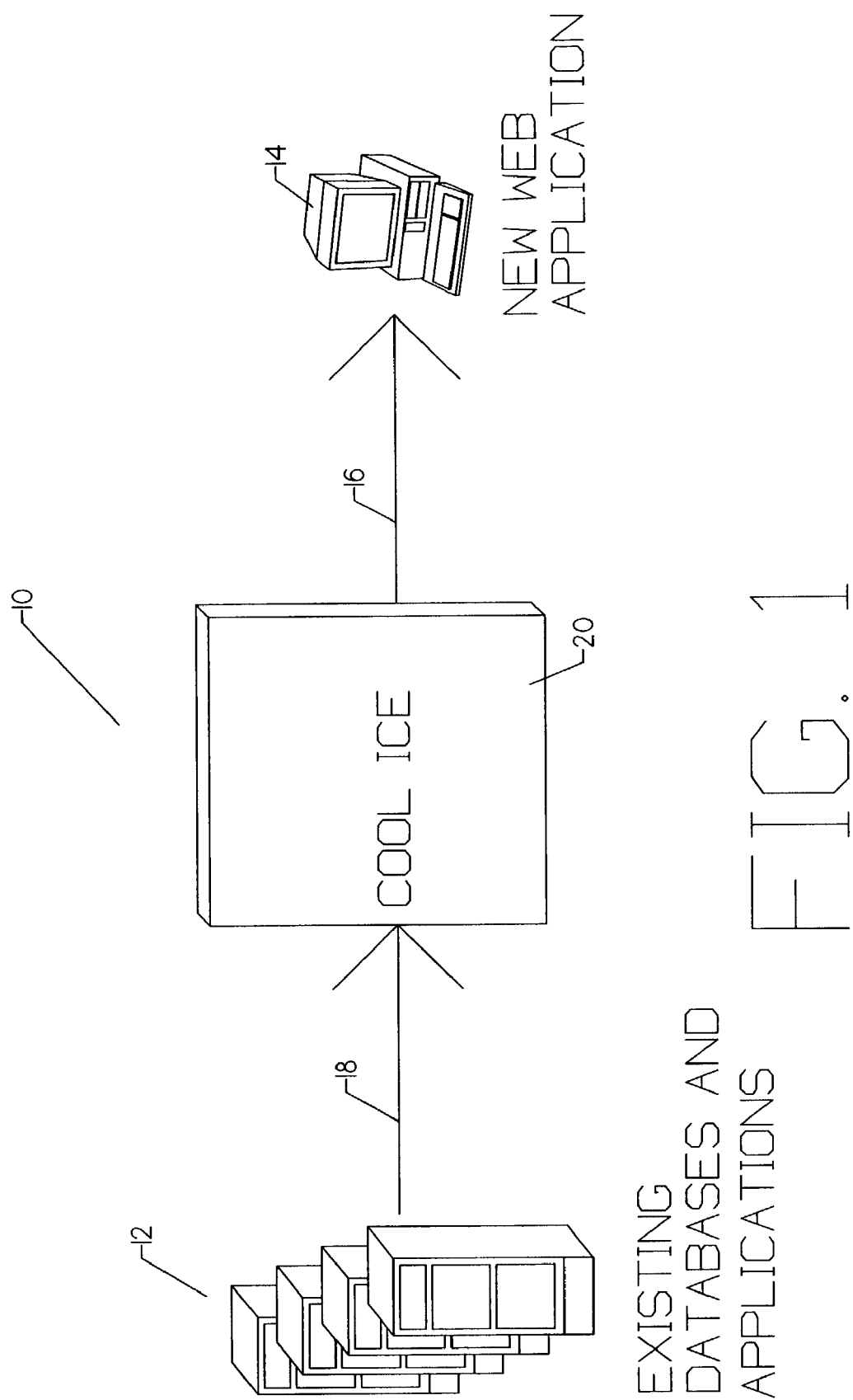
FIG. 1 is pictographic view of the Cool ICE system coupled between a user on the world wide web and an existing proprietary data base management system.

FIG. 1 is an overall pictographic representation of a system 10 permitting access to a proprietary data base management system via an Internet terminal. Existing data bases and applications 12 represents commercially available hardware and software systems which typically provide select users with access to proprietary data and data base management functions. In the preferred embodiment, existing data bases and applications 12 represents Series 2200 hardware and operating system containing one or more data bases prepared using Classic MAPPER data base management system, all available from Unisys Corporation. Historically, existing data bases and applications 12 could only be accessed from a dedicated, direct terminal link, either physically co-located with the other system elements or connected thereto via a secured dedicated telephonic, satellite, or fiber optic link.

With the preferred mode of the present invention, communication between new web application terminal 14 and existing data bases and applications 12 is facilitated. As discussed above, this permits nearly universal access by users world wide without specialized hardware and/or user training. The user effects the access using standardized HTML transaction language through world wide web link 16 to the Cool ICE system 20, which serves as a world wide web server to world wide web link 16.

Cool ICE system 20 appears to existing data bases and applications 12 as a database management system proprietary user terminal over dedicated link 18. Oftentimes, dedicated link 18 is an intranet or other localized network link. Cool ICE system 20 is currently available in commercial form without the present invention as Cool ICE Revision Level 2.1 from Unisys Corporation.

Figure 2:
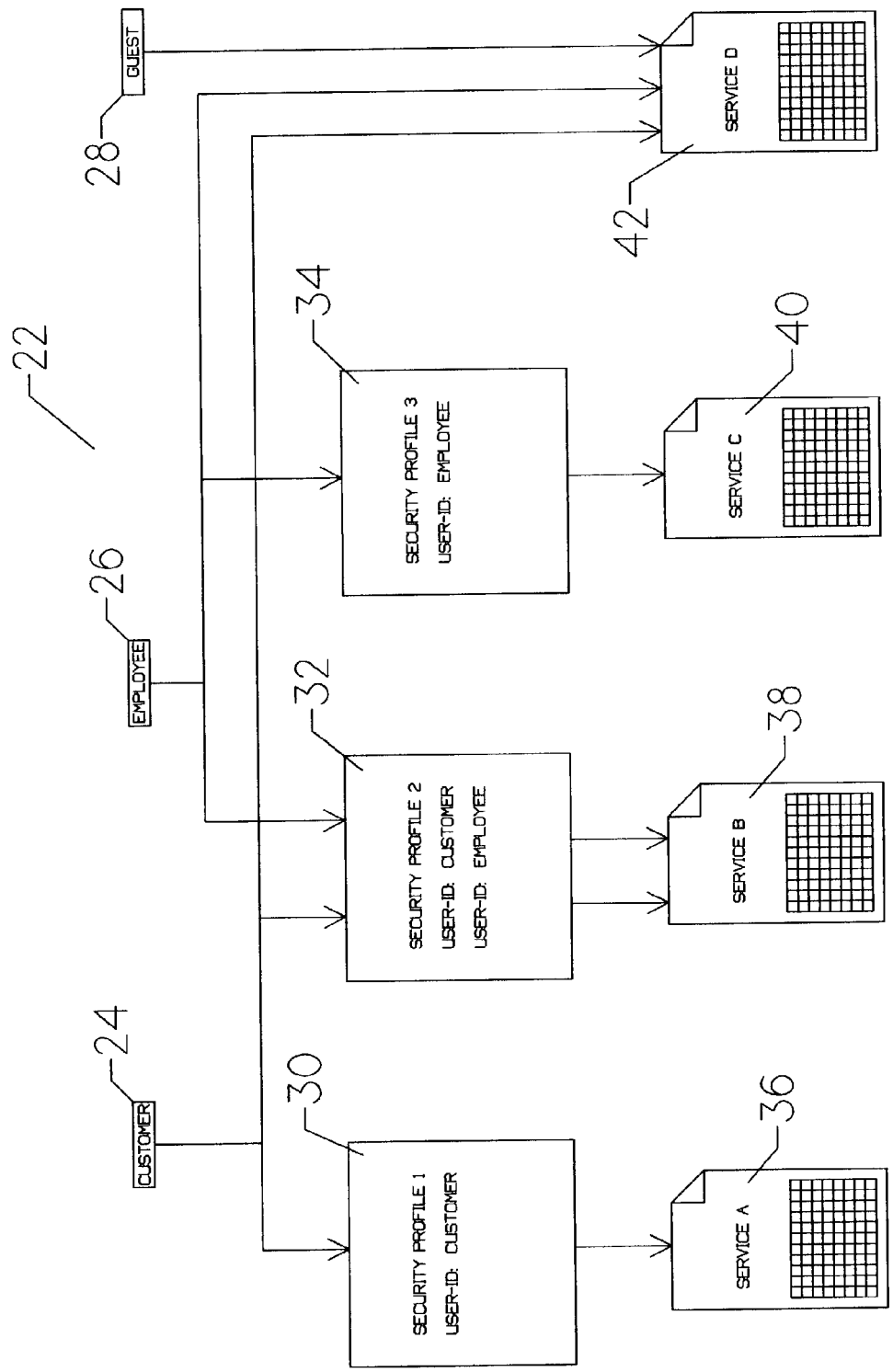
FIG. 2 is a schematic drawing showing the operation of a multi-level security system in accordance with the preferred embodiment of the present invention.

FIG. 2 is a schematic diagram of security system 22 of the preferred mode of the present invention. By way of example, there are four categories of service defined, each with its own functionality and portion of the data base. Service A 36 contains data and functions which should only be made available to customers. Service B 38 contains data and functions which should only be made available to customers or employees. Service C 40 contains data and functions which should only be made available to employees, and Service D 42, containing the least restrictive data and functions may be made available to anyone, including the general public.

In a typical application, Service D 42 might contain the general home page information of the enterprise. It will consist of only the most public of information. It is likely to include the name, address, e-mail address, and phone number of the enterprise, along with the most public of the business details. Usually, Service D 42 would include means of presenting the information in a sufficiently interesting way to entice the most casual of the public user to make further inquiry and thus become more involved with the objectives of the enterprise. Service D 42 represents the lowest level of security with data and functions available to all.

Service C 40 is potentially the highest level of classification. It contains data and functions which can be made available only to employees. In actual practice, this might entail a number of sub levels corresponding to the various levels of authority of the various employees. However, some services may be so sensitive that the enterprise decides not to provide any access via the internet. This might include such things as strategic planning data and tools, advanced financial predictions, specific information regarding individual employees, marketing plans, etc. The penalty for this extreme security measure is that even authorized individuals are prohibited from accessing these services via the internet, and they must take the trouble to achieve access via an old-fashioned dedicated link.

Customers and employees may share access to Service B 38. Nevertheless, these data and functions are sufficiently sensitive that they are not made public. Service B 38 likely provides access to product specifications, delivery schedules and quantities, and pricing.

For customer access only is Service A 36. One would expect marketing information, along with specific account information, to be available here.

These four service levels (i.e., Service A 36, Service B 38, Service C 40, and Service D 42) are regulated in accordance with three security profiles. The lowest level of security does not require a security profile, because any member of the general public may be granted access. This can be readily seen as guest category 28 (e.g., a member of the public) can directly access Service D 42. Of course, all other categories of user may also directly access Service D 42, because all members of the more restrictive categories (e.g., customers and employees) are also members of the general public (i.e., the least restrictive category).

Security Profile #1, 30 permits access to Service A 36 if and only if the requestor seeking access is a customer and therefore a member of customer category 24. Members of customer category 24 need to identify themselves with a customer identification code in order to gain access. The assigning and processing of such identification codes are well known to those of skill in the art.

Similarly, Security Profile #3, 34 permits access to Service C 40 if and only if the requestor seeking access is an employee and therefore a member of employee category 26. Security Profile #2, 32 permits access to Service B 38 to requesters from either customer category 24 or employee category 26, upon receipt of a customer identification code or an employee identification code.

Figure 3:
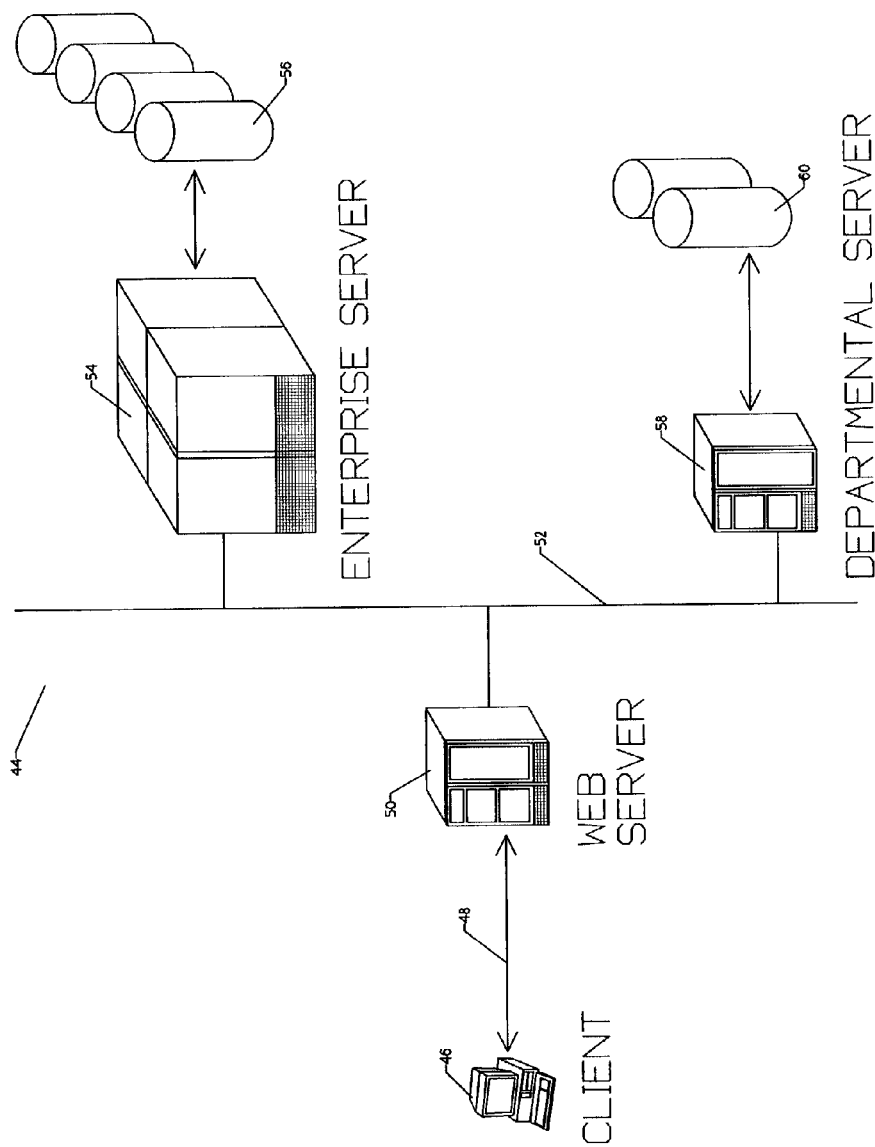
FIG. 3 is a pictographic view of the hardware of the preferred embodiment.

FIG. 3 is a pictorial diagram of hardware suite 44 of the preferred embodiment of the present invention. The client interfaces with the system via Internet terminal 46. Preferably, Internet terminal 46 is an industry compatible, personalized computer having a current version of the Windows operating system and suitable web browser, all being readily available commercial products. Internet terminal 46 communicates over world wide web access 48 using standardized HTML protocol.

The Cool ICE system is resident in web server 50, which is coupled to Internet terminal 46 via world wide web access 48. In the preferred mode, web server 50 is owned and operated by the enterprise owning and controlling the proprietary data base management system. Web server 50 may serve as the Internet access provider for Internet terminal 46 wherein world wide web access 48 is typically a dial-up telephone line. This would ordinarily be the case if the shown client were an employee of the enterprise. On the other hand, web server 50 may be a remote server site on the Internet if the shown client has a different Internet access provider. This would ordinarily occur if the shown client were a customer or guest.

In addition to being coupled to world wide web access 48, web server 50, containing the Cool ICE system, is coupled to Intranet 52 of the enterprise as shown. Intranet 52 provides the enterprise with communication for its internal business purposes. This communication is administered and managed by enterprise server 54 having enterprise server storage facility 56. Thus, employees and others granted access may communicate via Intranet 52 within the physical security provided by the enterprise. Also coupled to Intranet 52 is departmental server 58 having departmental server storage facility 60. Additional departmental servers (not shown) may be coupled to Intranet 52. The enterprise data and enterprise data base management service functionality typically resides within enterprise server 54, departmental server 58, and any other departmental servers (not shown).

Normal operation in accordance with the prior art would provide access to this data and database management functionality via Intranet 52 to users directly coupled to Intranet 52.

In the preferred mode of the present invention, access to this data and data base management functionality is also provided to users (e.g., Internet terminal 46) not directly coupled to Intranet 52, but indirectly coupled to Intranet 52 via web server 50. As explained below in more detail, web server 50 provides this access utilizing the Cool ICE system resident in web server 50.

Figure 4:
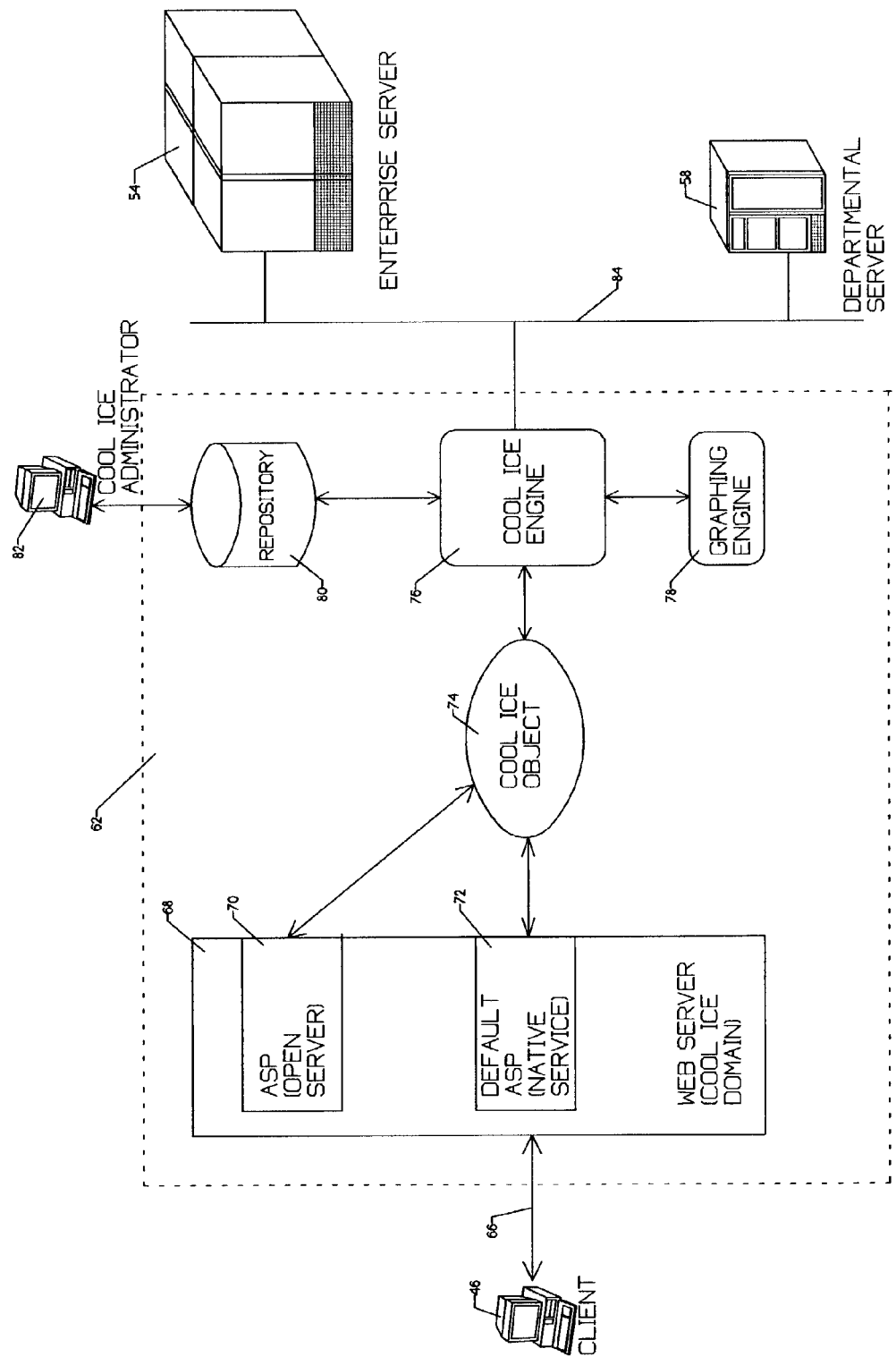
FIG. 4 is a semi-schematic diagram of the operation of the Cool ICE system.

FIG. 4 is pictographic view of the system of FIG. 3 with particular detail showing the organization and operation of the Cool ICE system 62, which is resident in the web server (see also FIG. 3). In this view, the client accesses the data base management system within the enterprise via Internet terminal 54 which is coupled to the web server 68 by world wide web path 66. Again, the Internet terminal 46 is preferably an industry standard computer utilizing a commercially available web browser.

The basic request/response format of the Cool ICE system involves a "service" (defined in greater detail below) which is an object of the Cool ICE system. The service is a predefined operation or related sequence of operations which provide the client with a desired static or dynamic result. The services are categorized by the language in which they were developed. Whereas all services are developed with client-side scripting which is compatible with Internet terminal 46 (e.g., HTML), the server-side scripting defines the service category. Native services utilize Cool ICE script for all server-side scripting. On the other hand, open services may have server-side scripting in a variety of common commercial languages including Jscript, VBScript, ActiveX controls, and HTML. Because native services are developed in the Cool ICE language, greater development flexibility and variety are available with this technique.

Web server 68 provides open server processor 70 for Active Server Pages (ASP's) which have been developed as open services and Default ASP processor 72 for native services. After the appropriate decoding (i.e., native or open service), a call to the corresponding Cool ICE object 74 is initiated as shown. The selected object is processed by Cool ICE engine 76.

Repository 80 is a storage resource for long term storage of the Cool ICE objects and short term storage of the state of a particular service. Further details concerning repository 80 may be found by consulting the above referenced, commonly-assigned, co-pending U.S. patent application. In the preferred mode of the present invention, the objects stored in repository 80 are typically very similar to MAPPER runs as described above. For a more detailed description of MAPPER runs, Classic MAPPER User Manual is available from Unisys Corporation and incorporated herein by reference. In the more general case, repository 80 would typically store predefined sequences of statements in the command language of the enterprise data base management system(s) to be accessed.

Cool ICE engine 76 sequences these previously stored command statements and uses them to communicate via Intranet 84 with the data base management system(s) (e.g., Classic MAPPER) resident on enterprise server 54 and departmental server 58. The short term storage capability of repository 80 is utilized by Cool ICE engine 76 to store the state and intermediate products of each service until the processing sequence has been completed. Following completion, Cool ICE engine 76 retrieves the intermediate products from repository 80 and formats the output response to the client, which is transferred to Internet terminal 46 via web server 68 and world wide web path 66.

Cool ICE Administrator 82 is available for coordination of the operation of Cool ICE system 62 and thus can resolve conflicts, set run-time priorities, deal with security issues, and serve as a developmental resource. Availability messages in accordance with the preferred mode of the present invention are prepared and/or modified via Cool ICE Administrator 82. Graphing engine 78 is available to efficiently provide graphical representations of data to be a part of the response of a service. This tends to be a particularly useful utility, because many of the existing data base management systems have relatively sparse resources for graphical presentation of data.

The combination of Cool ICE engine 76 and repository 80 permits a rather simplistic service request from Internet terminal 46 in dialog format to initiate a rather complex series of data base management system functions. In doing so, Cool ICE engine 76 emulates an Intranet user of the data base management system(s) resident on enterprise server 54 and/or departmental server 58. This emulation is only made possible, because repository 80 stores sequences of command language statements (i.e., the logic of the service request) and intermediate products (i.e., the state of the service request). It is these functions which are not available in ordinary dialog on the world wide web and are therefore not even defined in that environment.

Figure 5:
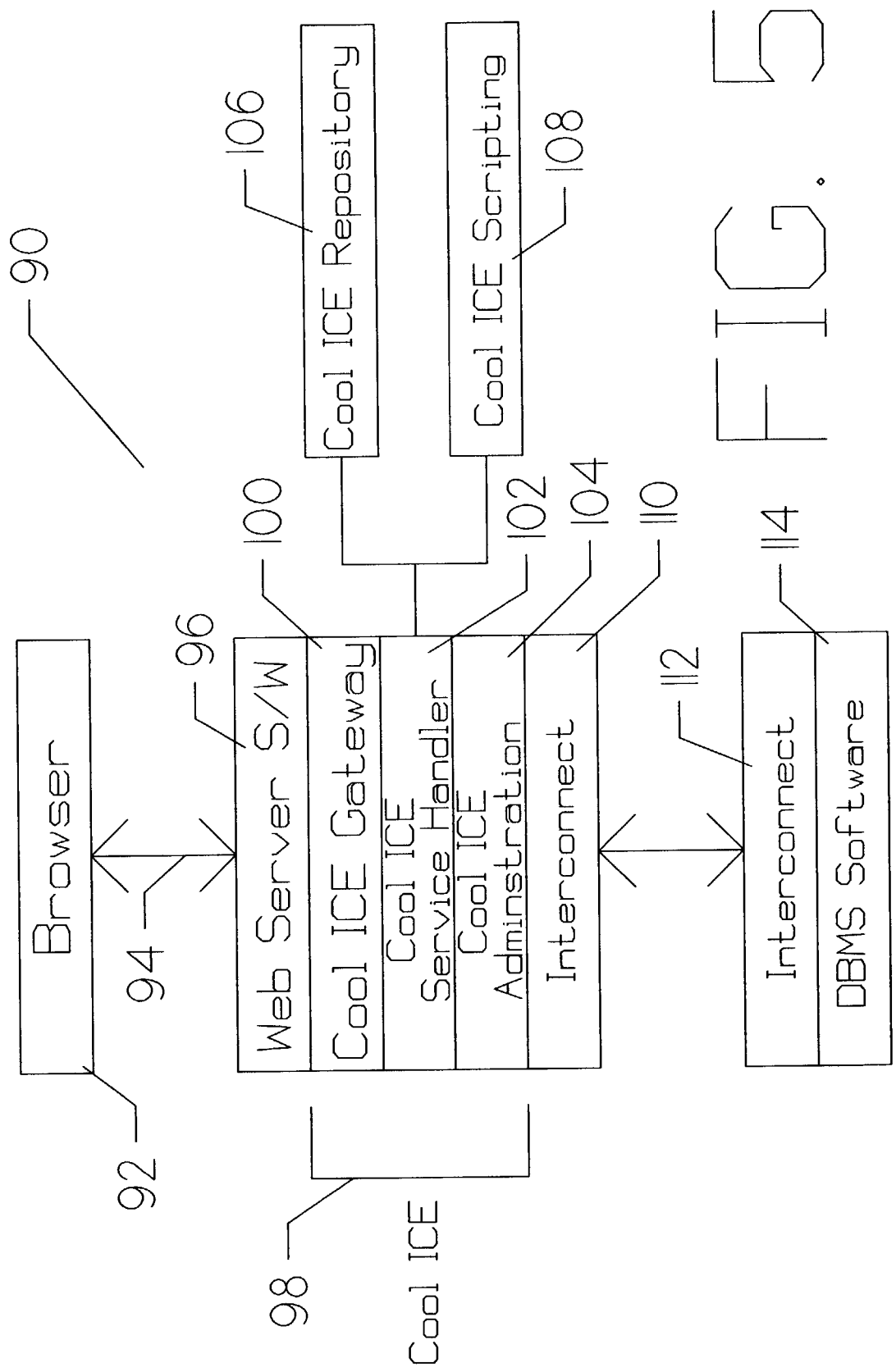
FIG. 5 is an overall schematic view of the software of the Cool ICE system.

FIG. 5 is a schematic diagram go of the software components of the Cool ICE system and the software components to which it interfaces in the preferred mode of the present invention. The client user of the Cool ICE system interfaces directly with web browser 92 which is resident on Internet terminal 46 (see also FIG. 4). Web browser 92 is a commercially available browser operating under a current version of the Windows operating system (e.g., Windows XP). The only special requirement of web browser 92 is that it be capable of supporting frames.

Web browser 92 communicates with web server software 96 via Internet standard protocol using HTML language using world wide web path 94. Web server software 96 is also commercially available software, which is, of course, appropriate for to the web server host hardware configuration. In the preferred mode of the present invention, web server software 96 is hosted on a Series 2200 mainframe available from Unisys Corporation, from which web server software 96 is readily available.

Cool ICE system software 98 consists of Cool ICE Gateway 100, Cool ICE service handler 102, Cool ICE administration 104, Cool ICE repository 106, and Cool ICE scripting 108. It is these five software modules which interface to web server software 96 in HTML using a dialog format and interface to data base management system interconnect 110 in the command language of the enterprise data base management system(s) (i.e., Classic MAPPER in the preferred mode of the present invention).

Cool ICE gateway 100 is the interface between standard, commercially available, web server software 96 and the internal Cool ICE system language and logic. As such, Cool ICE gateway 100 translates the dialog format, incoming HTML service request into internal Cool ICE language. and protocol. Intrinsic in this translation is a determination of the service category (see also FIG. 4)—that is whether the service request is a native service (i.e., with Cool ICE server-side scripting) or an open service (i.e., with server-side scripting in another commercial language).

The service request, received from Cool ICE gateway 100, is utilized by Cool ICE service handler 102 to request the corresponding object from Cool ICE repository 106 and to open temporary state storage using Cool ICE repository 106. Cool ICE scripting 108 is called to translate the server-side scripting of an open service request as necessary. Cool ICE service handler 102 sequences through the command language statements of the object received from Cool ICE repository 106 and forwards each command in turn to data base management system software 114 for accessing of the enterprise proprietary data base management system. Cool ICE service handler 102 receives each of the intermediate products from data base management system software 114 and transfers each to Cool ICE repository 106 for temporary storage until completion of the service request. Cool ICE service handler 102 retrieves the intermediate products from Cool ICE repository 106 upon completion of the service request and formulates the Cool ICE response for transfer to browser 92 via web server software 96 and world wide web path 94.

Cool ICE administration 104 implements automatic and manual control of the process. It provides for record keeping, for resolution of certain security issues, and for development of further Cool ICE objects. The script providing for creation and modification of the availability message is contained within Cool ICE administration 104. This script creates a text file and performs any desired edits on the text contained therein. Interconnect 110 and interconnect 112 are software interface modules for communicating over the enterprise Intranet (see also FIG. 4). These modules are dependent upon the remaining proprietary hardware and software elements coupled to the enterprise Intranet system. In the preferred mode of the present invention, these are commercially available from Unisys Corporation.

Figure 6:
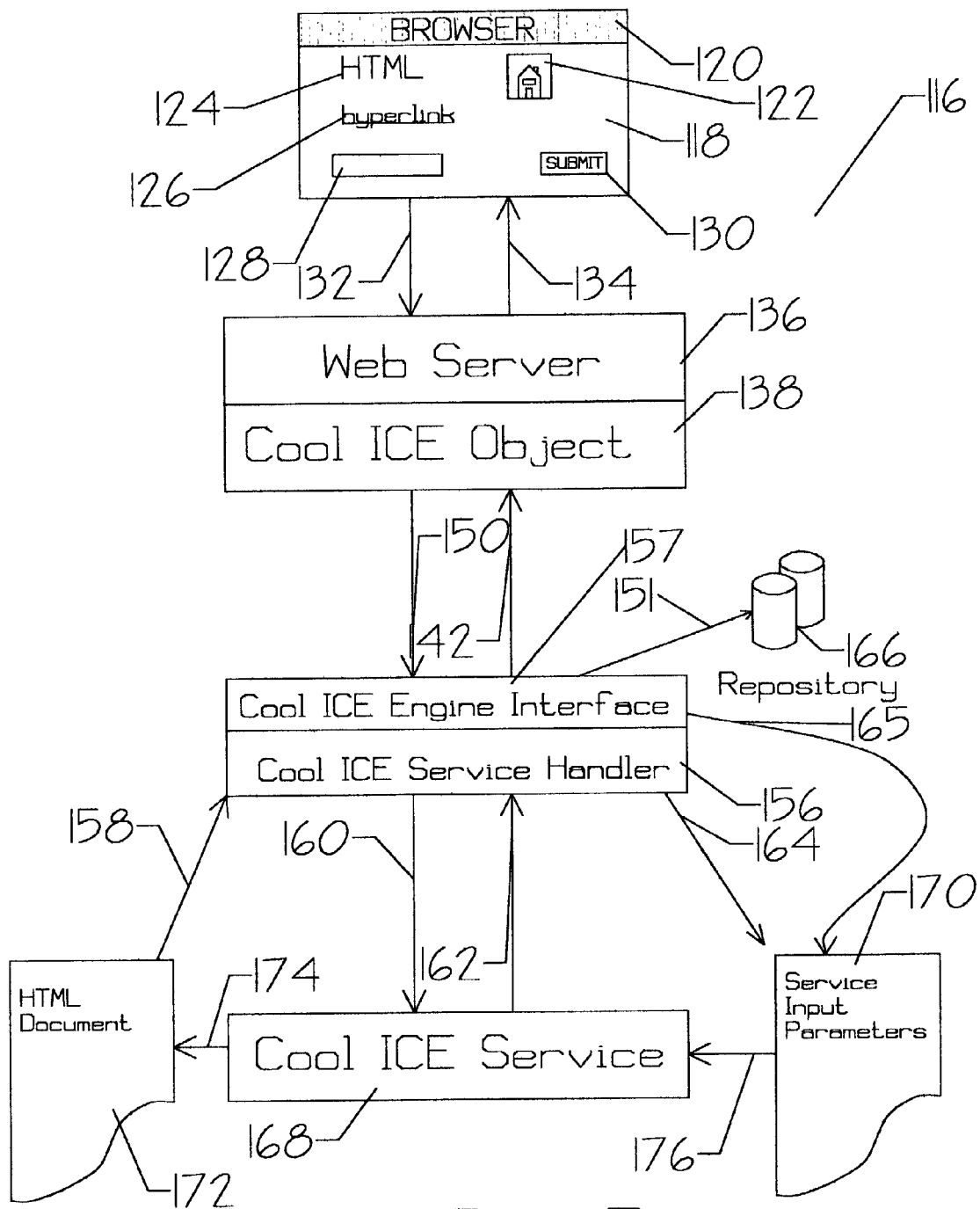
FIG. 6 is a schematic view of a service request.

FIG. 6 is a schematic diagram 116 showing the processing of a service request by the Cool ICE system. Screen 118 is the view as seen by the client or user at an Internet terminal (see also FIG. 4). This screen is produced by the commercially available browser 120 selected by the user. Any such industry standard browser is suitable, if it has the capability to handle frames. The language of screen 118 is HTML 124. Hyperlink 126 is used in locating the URL of the Cool ICE resident server. In many instances, this will simply be the Internet access provider of the Internet terminal, as when the Internet terminal is owned by the enterprise and the user is an employee. However, when the user is not an employee and the Internet terminal is not necessarily owned by the enterprise, it becomes more likely that hyperlink 126 identifies a remotely located server.

Icon 122 is a means of expressly identifying a particular service request. Such use of an icon is deemed to be unique. Additional detail concerning this use of an icon is available in the above identified, commonly assigned, co-pending U.S. patent application. Window area 128 provides for the entry of any necessary or helpful input parameters. Not shown are possible prompts for entry of this data, which may be defined at the time of service request development. Submit button provides the user with a convenient means to transmit the service request to the web server in which the Cool ICE system is resident.

Upon "clicking on" submit button 130, screen 118 is transmitted to web server 136 via world wide web path 132. As discussed above, world wide web path 132 may be a telephonic dial-up of web server 136 or it might be a long and complex path along the Internet if web server 136 is remote from the originating Internet terminal. Web server 136 is the software which performs the retrieval of screen 118 from world wide web path 132.

Screen 118 is transferred from web server 136 to Cool ICE object 138, wherein it is converted to the internal Cool ICE protocol and language. A browser input file is opened at repository 166 via path 151. Thus the initial service request can be accessed from repository 146 during processing up until the final result is transferred back to the user. This access readily permits multi-step and iterative service request processing, even though the service request was transferred as a single Internet dialog element. This storage technique also provides initially received input parameters to later steps in the processing of the service request.

Cool ICE object 138 notifies Cool ICE service handler 156 that a service request has been received and logged in. The service request itself is utilized by Cool ICE service handler 156 to retrieve a previously stored sequence of data base management system command statements from repository 166. Thus, in the general case, a single service request will result in the execution of a number of ordered data base management system commands. The exact sequence of these commands is defined by the service request developer as explained in more detail below.

Service input parameters 170 is prepared from the service request itself and from the command sequence stored in repository 166 as shown by path 164. This list of input parameters is actually stored in a dedicated portion of repository 166 awaiting processing of the service request.

Each command statement from repository 166 identified with the service request is sequentially presented to Cool ICE service 168 for processing via path 160. The corresponding input parameter from service input parameters 170 is coupled with each command statement via path 176 to produce an appropriate query of the enterprise data base management system at Cool ICE service 168. After the enterprise data base management system has responded to a given query, the intermediate products are stored as entries in HTML document 172 which is also stored in a dedicated portion of repository 166.

After all command statements corresponding to the service request have been processed by the enterprise data base management system and HTML document 172 has been completed, the result is provided via path 158 to Cool ICE service handler 156 for temporary storage as a browser output file in repository 166 via path 151. Cool ICE object 138 receives the browser output file via path 142. The response is converted to HTML protocol and transferred by web server 136 and world wide web path 134 to be presented to the user as a modified screen (not shown).

Figure 7:
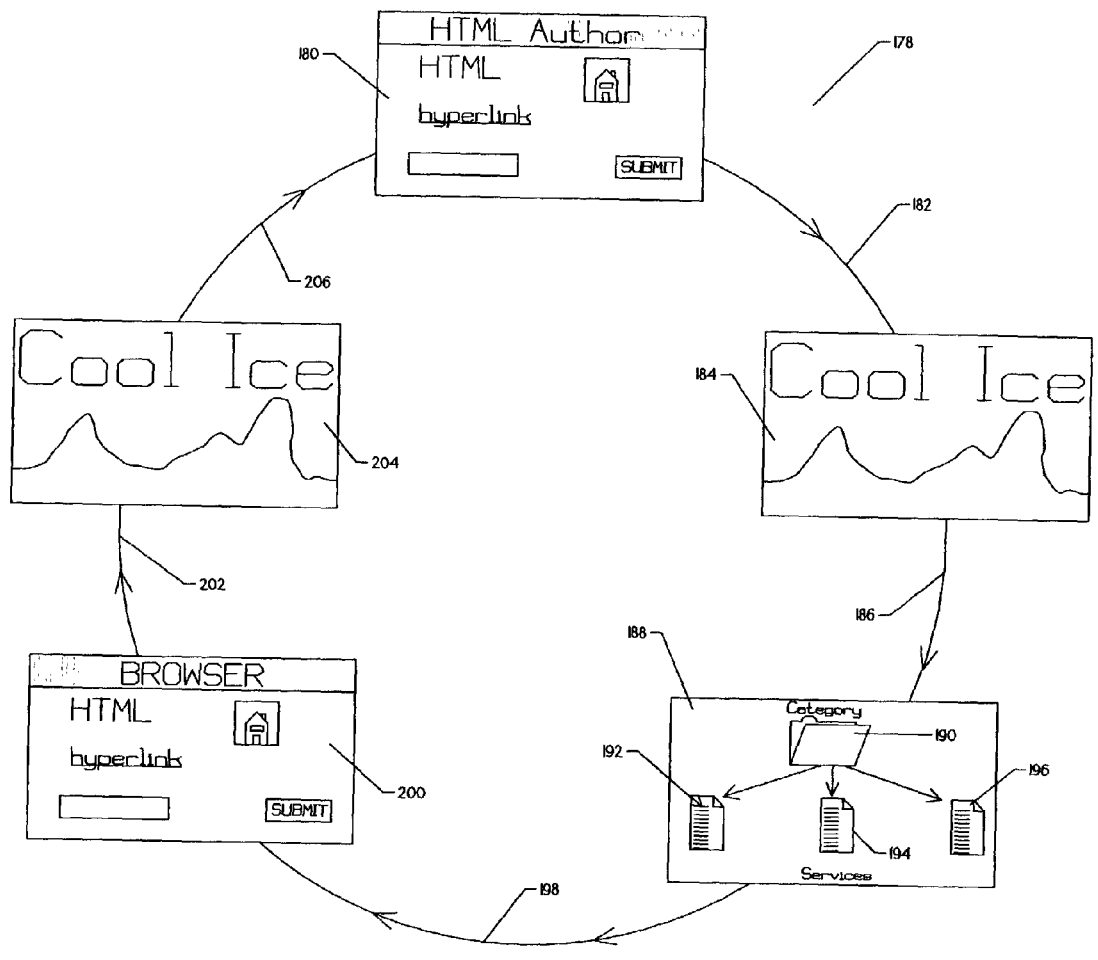
FIG. 7 shows a schematic view of a service request sequence.

FIG. 7 is a pictographic drawing 178 of the development process for creating a Cool ICE service. HTML document 180 is created utilizing any commercially available standard HTML authoring tool (e.g., Microsoft FrontPage). The resulting HTML document 180 is stored as a normal .HTM file. This file will be utilized as a template of the service to be developed.

The authoring process moves along path 182 to invoke the administration module of the Cool ICE system at element 184. The new dynamic service is created using HTML document 180 stored as a normal .HTM file as a template. As HTML document 180 is imported into Cool ICE, sequences of script for the beginning and end of the HTML code are automatically appended to the service. Required images, if any, are also uploaded onto the web server (see also FIGS. 5 and 6). The service is edited by inserting additional Cool ICE script, as required. A more detailed description of the editing process may be found in Cool ICE User's Guide, Revision 2.1, available from Unisys Corporation and incorporated herein by reference.

The completed service script is transferred along path 186 to element 188 for storage. The service is stored as an object in the repository (see also FIGS. 5 and 6). Storage is effected within the appropriate category 190 as discussed above, along with services 192, 194, and 196 within the same category.

The process proceeds along path 198 to element 200 for testing. To perform the testing, the URL for the newly created service is entered into the browser of the Internet terminal, if known. The typical URL is as follows:

http://machine-name/ICEGate/Category/Service

If the URL for the new service is not known, a list of the available services may be determined from the Cool ICE system by specifying the Cool ICE URL as follows:

http;://machine-name/ICEGate

This call will result in a presentation of a menu containing the defined categories. Selecting a category from the list will result in a menu for the services defined within that category. The desired service can thus be selected for testing. Selection of the service by either means will result in presentation of the HTML page as shown at element 200.

The process proceeds to element 204 via path 202, wherein the HTML page may be enhanced. This is accomplished by exporting the HTML document from the Cool ICE administration module to a directory for modification. By proceeding back to HTML document 180 via path 206, the exported HTML template is available for modification using a standard HTML authoring tool. After satisfactory completion, the finished HTML document is saved for future use.

Figure 8:
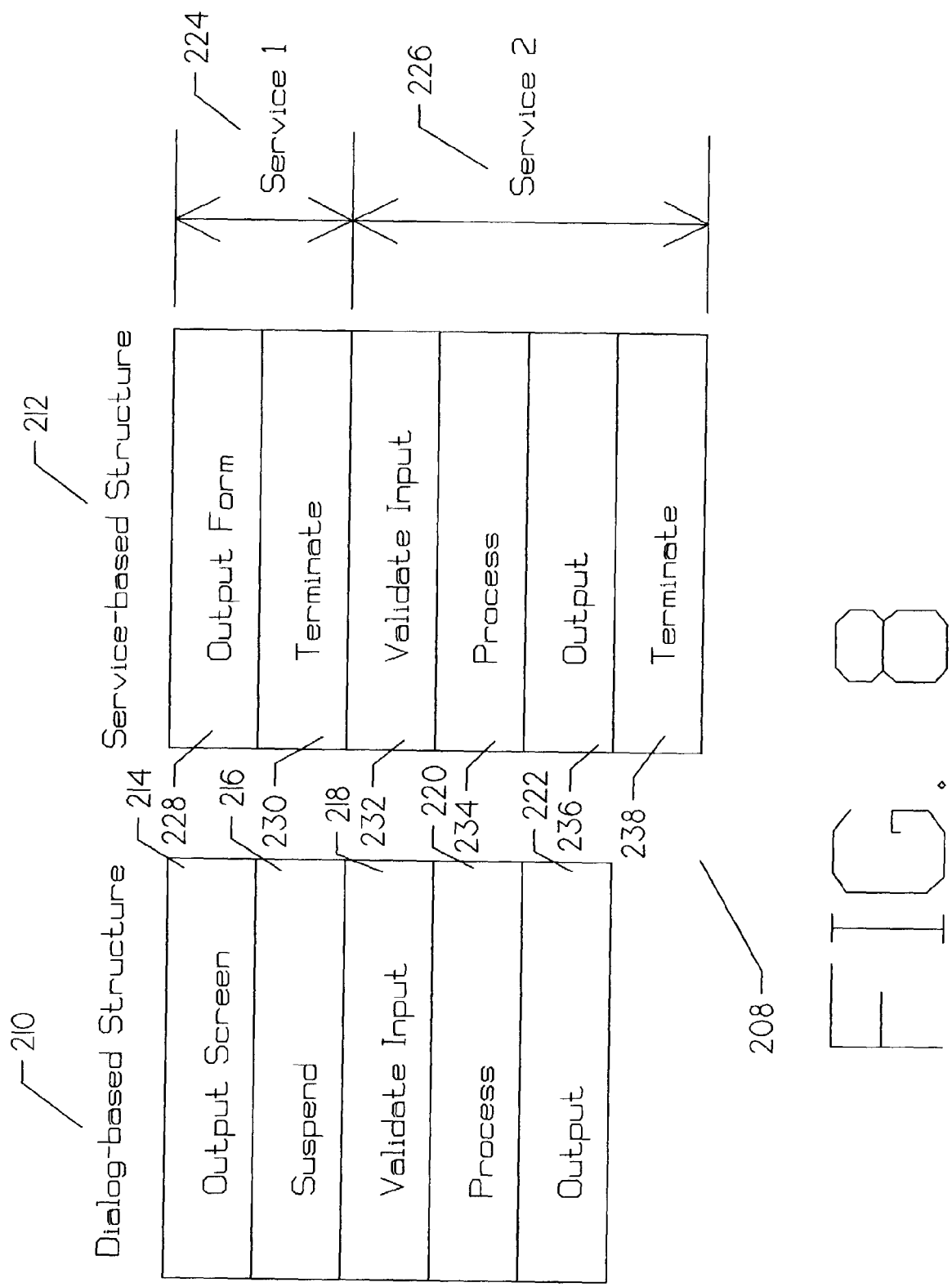
FIG. 8 is a diagrammatic comparison between a dialog-based structure and a service-based structure.

FIG. 8 is a diagram showing a comparison between dialog-based structure 210 and service-based structure 212. Dialog-based structure 210 is the norm for the typical existing proprietary data base management system (e.g., Classic MAPPER). The user, normally sitting at a dedicated user terminal, transfers output screen 214 to the data base management system to request a service. The user terminal and its normally dedicated link are suspended at element 216 to permit transfer and operation of the data base management system. The input is validated at element 218, while the user terminal and its normally dedicated link remains suspended.

The data base management system processes the service request at element 220 while the user terminal remains suspended. Output occurs at element 222 thereby releasing the suspension of the user terminal. Thus, a true dialog is effected, because one part of the dialog pair (i.e., the user terminal) is suspended awaiting response from the data base management system. This type of dialog is best accomplished in an environment wherein at least the user terminal (or data base management system) is dedicated to the dialog, along with the link between user terminal and data base management system.

Service-based structure 212 illustrates on of the basic constraints of the world wide web protocol. To ensure that each of the elements on the world wide web are sufficiently independent to prevent one element from unduly delaying or "hanging-up" another element to which it is coupled awaiting a response, the communication protocol forces a termination after each transmission. As can be readily seen, even the simplest dialog requires at least separate and independent transactions or services. The first service, Service 224, involves the transmissions of output form 228 from the Internet user terminal. This transmission is immediately and automatically followed by termination 230 to ensure independence of the sender and receiver.

The second service, Service 226, enables the receiver of output form 228 to process the request and output an appropriate response. The validation of the input at element 232, processing 234, and output 236 all occur within the receiver of output form 228. Immediately and automatically, termination 238 follows. Thus, if Internet transactions are to be linked into a true dialog to permit data base management functions, the state must be saved from one service to the next as taught herein.

In the preferred mode of the present invention, the state of a service is saved in the repository (see also FIGS. 4 and 5) for use in the next or subsequent services.

Figure 9:
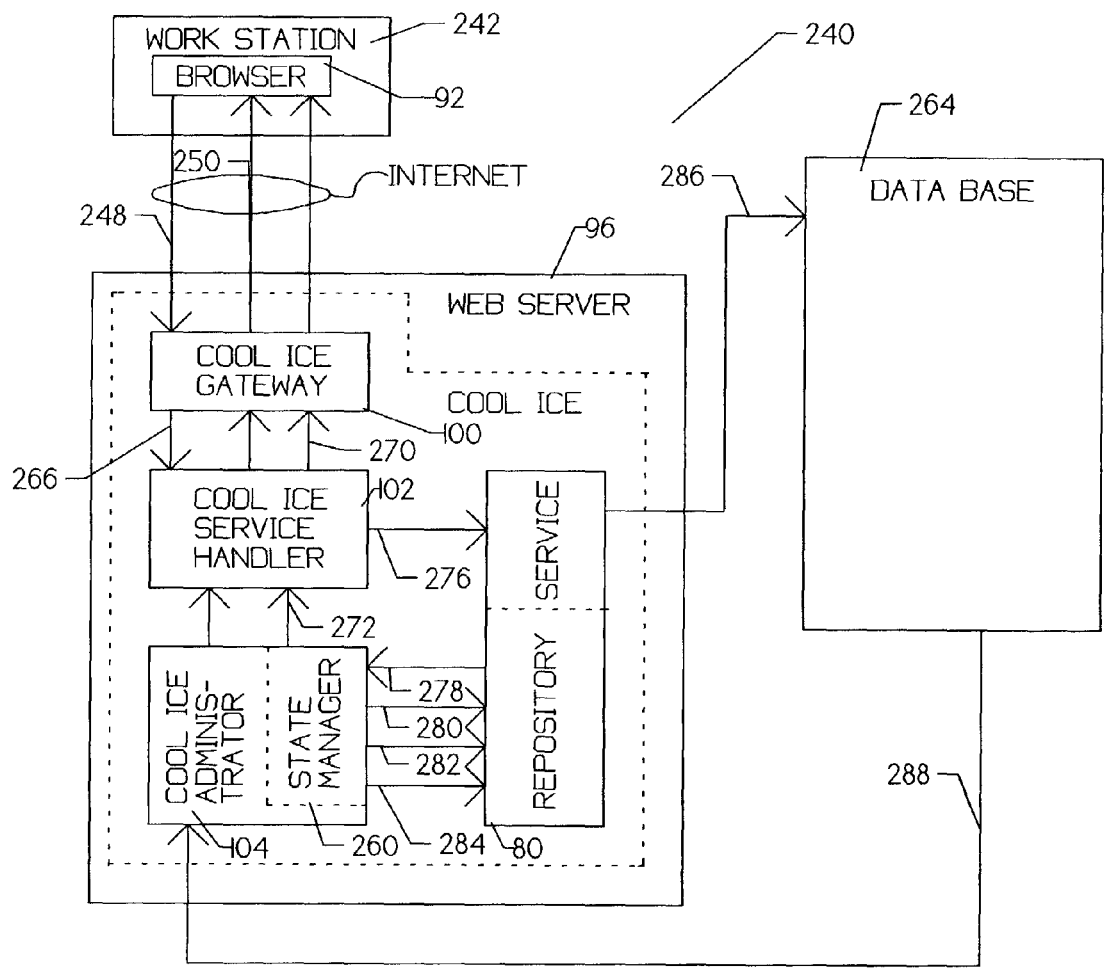
FIG. 9 is a detailed diagram of the storage and utilization of state information within the repository.

FIG. 9 is a schematic diagram 240 of the preferred mode of the present invention showing normal data flow during operation, with special attention to the state saving feature. Work station 242 is an industry compatible personal computer operating under a commonly available operating system such as Windows XP. Browser 92 is a standard, commercially available web browser having frames capability. Path 248 is the normal world wide web path between work station 242 and web server 96 for the transfer of service requests and input data. These transfers are converted by Cool ICE gateway 100 as explained above and sent to Cool ICE service handler 102 via path 266 for disposition.

The service request for data and/or another function is converted into the data base management language by reference to the service definition portion of repository 80 through reference along path 276. The actual command language of the data base management system is utilized over path 286 to access data base 264. The resultant data from data base 264 is transferred to Cool ICE administrator 104 via path 288. State manager 260 determines whether the original service request requires additional queries to data base 264 for completion of the dialog. If yes, the resultant data just received from data base 264 is transferred via path 284 to repository 80 for temporary storage, and the next query is initiated over path 286, and the process is repeated. This is the state saving pathway which is required to provide the user of the Cool ICE system to function in a dialog form over the world wide web.

Upon receipt of the resultant data from the final query of data base 264, state manager 260 determines that the service request is now complete. State manager 260 notifies repository 80 via path 280, and the intermediate products are retrieved from temporary storage in repository 80 via path 278 and supplied to Cool ICE service handler 102 via path 272 for formatting. State manager 260 then clears the intermediate products from temporary storage in repository 80 via path 282. The final response to the service request is sent to Cool ICE gateway 100 via path 270 for translation and to browser 92 via path 250.

Figure 10:
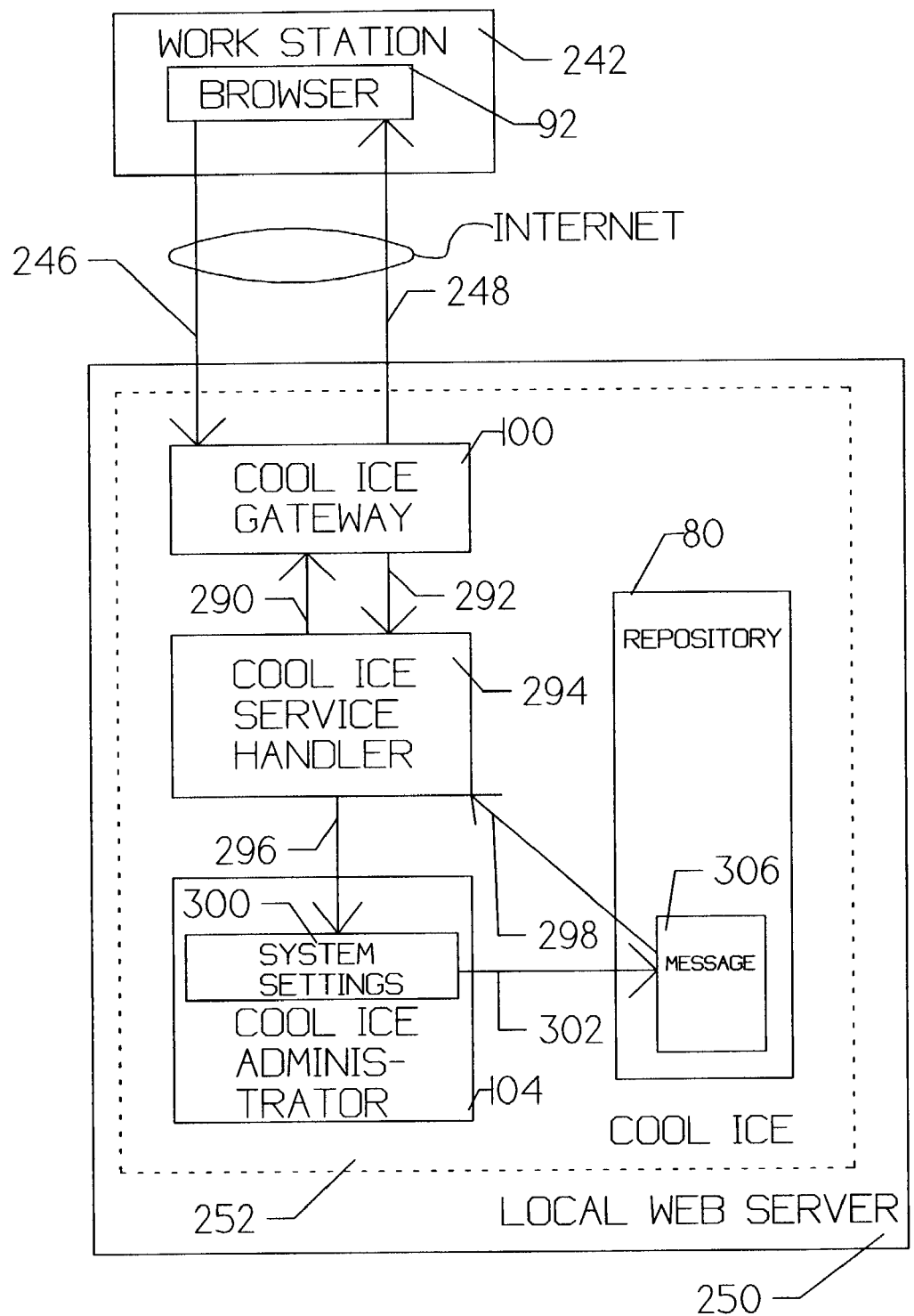
FIG. 10 is a detailed diagram showing the preparation and usage of the availability message.

FIG. 10 is a detailed diagram of the Cool ICE system showing presentation of the availability message in accordance with the preferred mode of the present invention. In the example presented, a user at work station 242 operating within commercially available browser 244, makes a service request by transferring an appropriate HTML page via path 246 to local web server 250.

The service request is presented to Cool ICE gateway 100 within Cool ICE system 252. After conversion as discussed above, the service request is presented to Cool ICE service handler 294 via path 292. Cool ICE service handler 294 requests status of Cool ICE system 252 from system settings 300 of Cool ICE administrator 104 via path 296. In accordance with the present example, Cool ICE system 252 is not available to honor service requests because of a maintenance condition. Therefore, Cool ICE administrator 104 accesses repository 80 for the previously created object which transfers the unavailability message to the user. The access is via path 302 to message 306, the storage area within repository 80, which maintains the unavailability message object.

The object thus accessed is transferred to Cool ICE service handler 294 via path 298 for execution. Cool ICE handler 294 prepares the HTML display page containing the unavailability message which is sent to Cool ICE gateway 100 via path 290. After conversion as described above, the unavailability message is transferred via path 248 to work station 242 for presentation to the user.

Figure 11:
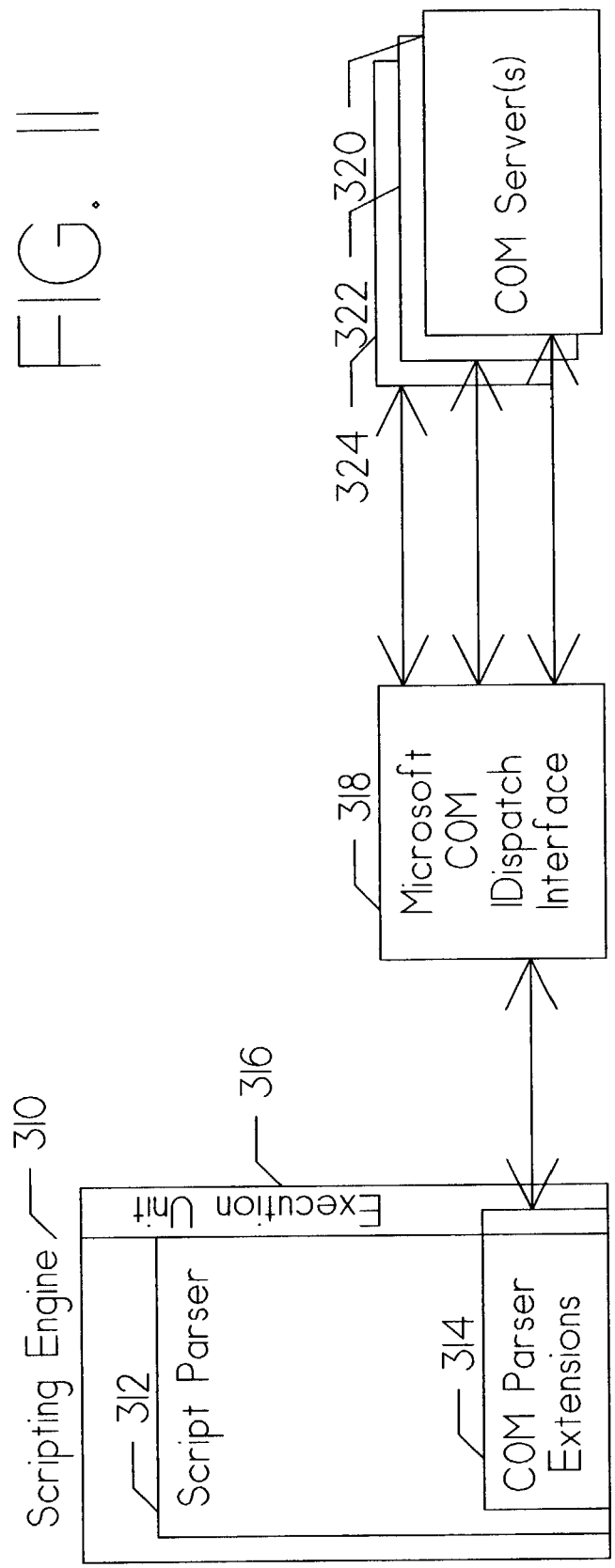
FIG. 11 is a detailed view of the manner in which the Cool ICE scripting engine is utilized to instantiate COM clients.

FIG. 11 is a detailed diagram showing integration with any object oriented or non-object oriented scripting engine 310 (i.e., into Cool ICE service handler 294 in the preferred mode, see also FIG. 10). As explained above, the preferred mode defines a generalized textual method for representing COM server names, properties, data types, and values. The COM client must support the five basic operations of: create instance; invoke method; set property value; get property value; and release instance. To implement these operations, the scripting engine (i.e., Cool ICE service handler 294) defines a corresponding script statement for each as explained in more detail below.

Script parser 312 reads text from the script file being executed and interprets the language syntax. It converts the language syntax into a sequence of operations that can be performed by execution unit 316. COM parser extensions 314 contains the language-specific implementation required in the conversion. It functions as part of the script parser, allowing the interpreter to recognize additional language-consistent syntax describing the COM client operations that can be performed.

Execution unit 316 is responsible for executing the operations derived by script parser 312. The intersect area represents the portion of execution unit 316 which is called by the COM parser extensions to perform COM interface operations. Microsoft IDispatch Interface 318 is the part of the Microsoft Windows Operating System that facilities access to COM servers by client programs. Relative to execution unit 316, it consists of a set of Operating System application programming interfaces (API's). COM servers 320, 322, and 324 are the actual COM servers with which the script developer wishes to invoke and interact.

FIG. 12 is a table showing the format of the "client create instance". The lab field provides the label of a destination in the event that the subject component cannot be instantiated. Prog-id gives the name of the subject component. Vch must be an integer type which is a variable to receive the instance handle. Error status is captured by a variable, vmsg, if the operation fails.

FIG. 13 is a table showing the format of the client invoke method. Dt is a comma-separated list indicating the data types of the method arguments. A data type value specifies the direction and data type of a method argument, and consists of a direction indicator and/or a type indicator. The general syntax of a data type value is:

[&][type]

An argument can be defined as taking a value ("[in]" in IDL syntax), returning a value ("[out]"), or both ("[in,out]"). The leading "&", if present, indicates that the argument returns a value. That is, the argument returns one or more items of data in it. The "type", if present, indicates the data type of the argument if and only if it takes a value from the client. Data type specification is never required if the argument only returns a value, because the component will include the data type with the value. Therefore:

| | |
|---|---|
| type | [in] |
| & | [out] |
| &type | [in, out] |

Microsoft COM uses a value container called a "variant" to specify method arguments. Variants are a chameleon data type that can hold many types of values. The basic data types (VARIANT types) allowed for type are as follows:

| | |
|---|---|
| $UI_1$ | $VT\_UI_1$ (unsigned integer—one byte) |
| BOOL | VT_BOOL (Boolean value—zero/one) |
| $I_2$ | $VT\_I_2$ (signed integer—2 bytes) |
| $I_4$ | $VT\_I_4$ (signed integer—4 bytes) |
| $R_4$ | $VT\_R_4$ (real [floating point]—4 bytes) |
| R8 | VT_R8 (real [floating point]—8 bytes) |
| CY | VT_CY (currency value) |
| BSTR | VT_BSTR (binary string) |
| DATE | VT_DATE (date value) |
| DISP | VT_DISPATCH (object pointer—a.k.a. secondary instance handle) |
| VAR | VT_VARIANT (variant) |

For example:

| | |
|---|---|
| BSTR | a binary string will be passed to the component - no value is returned. |
| &R8 | an eight byte number will be passed to AND returned by the component. |
| & | a value is returned by the component. The data type will be specified by the component. |

The type syntax supports arguments defined as arrays (VT_ARRAY). The presence of paired square bracket characters immediately following the basic data type, indicate an array of the specified type. The number of elements in the array is determined by the actual data source as described in detail below.

For example:

| | |
|---|---|
| BSTR[ ] | an array of BSTR's (binary strings) |
| $I_4$[ ] | an array of $I_4$'s (signed integers of four bytes each) |

When the data type is VAR (variant), an array must be specified. Additionally, within the square brackets, the user must specify the array element definition. An array element definition consists of a comma-separated list of one or more basic data types.

For example:

| | |
|---|---|
| VAR[BSTR,R8] | an array of variants. The first element in the array is type BSTR, and the second is type R8. The sequence repeats for all remaining elements of the array (if any). |
| VAR[$I_4$] | an array of variants. Each element in the array is type $I_4$. This is logically equivalent to "$I_4$[ ]", but is not identical. The former is an array of type VAR, with elements of type $I_4$. The latter is simply an array of type $I_4$. |

-continued

| | |
|---|---|
| VAR[VAR[BSTR,R8]] | an array of an array of variants. The first element in the array is also an array. The "sub-array" contains two elements - the first is of type BSTR, and the second is type R8. The sequence repeats for all remaining elements of the array (if any). |

The argument list is used in conjunction with the preceding dt list to specify the actual data values of the method arguments. The first item in the arg list takes its data type from the first item in the dt list; the second item in the arg list takes its data type from the second item in the dt list; etc. The number of items in the argument must match the number of items in the data type list. A method's return value (if defined) does not get its type from the data type list as the component will supply this information at the time the value is returned. However, the script designer does need to know this data type so that an appropriate receiving container can be specified.

This feature supports three basic forms of arguments:

| | |
|---|---|
| Variable/literal data | any concatenation of script variables, literal data or reserved words. Can be used for non-array arguments that do not return a value. |
| Simple variable | a single script variable specification. Can be used for non-array arguments. |
| Result report | a single result report specification. For use with type BSTR or array arguments. |

If an argument of type DISP returns a value (i.e., "&" or "&DISP"), a secondary instance handle is allocated, and its value returned in the specified argument variable. This handle variable can then be used on subsequent COM Client statements to manipulate the component instance. The application should release this handle (@CCR) when it is no longer needed.

FIG. 14 is a table showing the format of the get property value. The fields are as previously defined.

FIG. 15 is a table showing the format for the set property value. Again, the fields are as previously defined.

FIG. 16 is a table showing the format for the client release instance(s). The fields are as previously defined.

Figure 17:
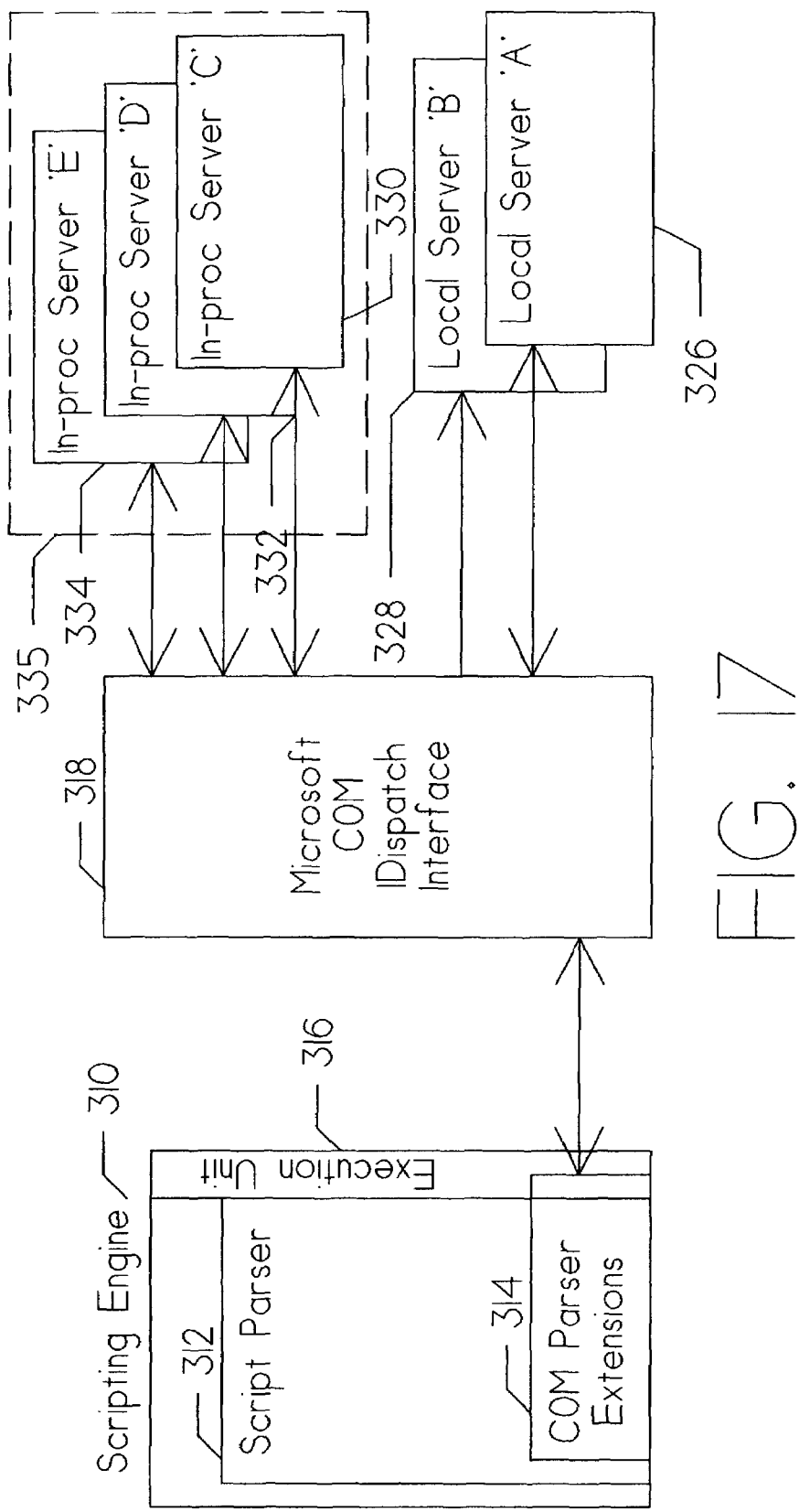
FIG. 17 is a detailed diagram showing instantiation of local and in-process servers.

FIG. 17 is a detailed diagram showing the distinction between local and in-process COM servers. Except for this distinction, it is similar to FIG. 11, discussed above. By definition, local servers 326 and 328 always execute within a process different from that of the calling client. As a result, there is no risk that local servers 326 and 328 will corrupt the memory space assigned to or maliciously copy sensitive data from the calling client. Thus, there is no special treatment required for local servers.

In-process servers, on the other hand, execute within the same process as the calling client, by definition. Though this tends to be most efficient in terms of execution, it is also the most dangerous in terms of corrupting the memory space of or copying sensitive data from the calling client. Therefore, special handling is required in accordance with the present invention to preserve calling client integrity.

In accordance with the preferred mode of the present invention, in-process servers 330, 332, and 334 are instantiated by surrogate server 335 as shown. In practice surrogate server 335 is created by the developer of the calling client for the sole purpose of instantiating in-process servers (i.e., in-process servers 330, 332, and 334) within the separate process dedicated to this purpose. Because all in-process servers are instantiated within the same surrogate server process (i.e., 335), maximum efficiency is produced in accordance with the needed protections offered. Thus, in-process servers 330, 332, and 334, because they only interact indirectly with the calling client through the surrogate server in its own dedicated process, they cannot corrupt the memory space of or copy sensitive data from the calling client.

Figure 18:
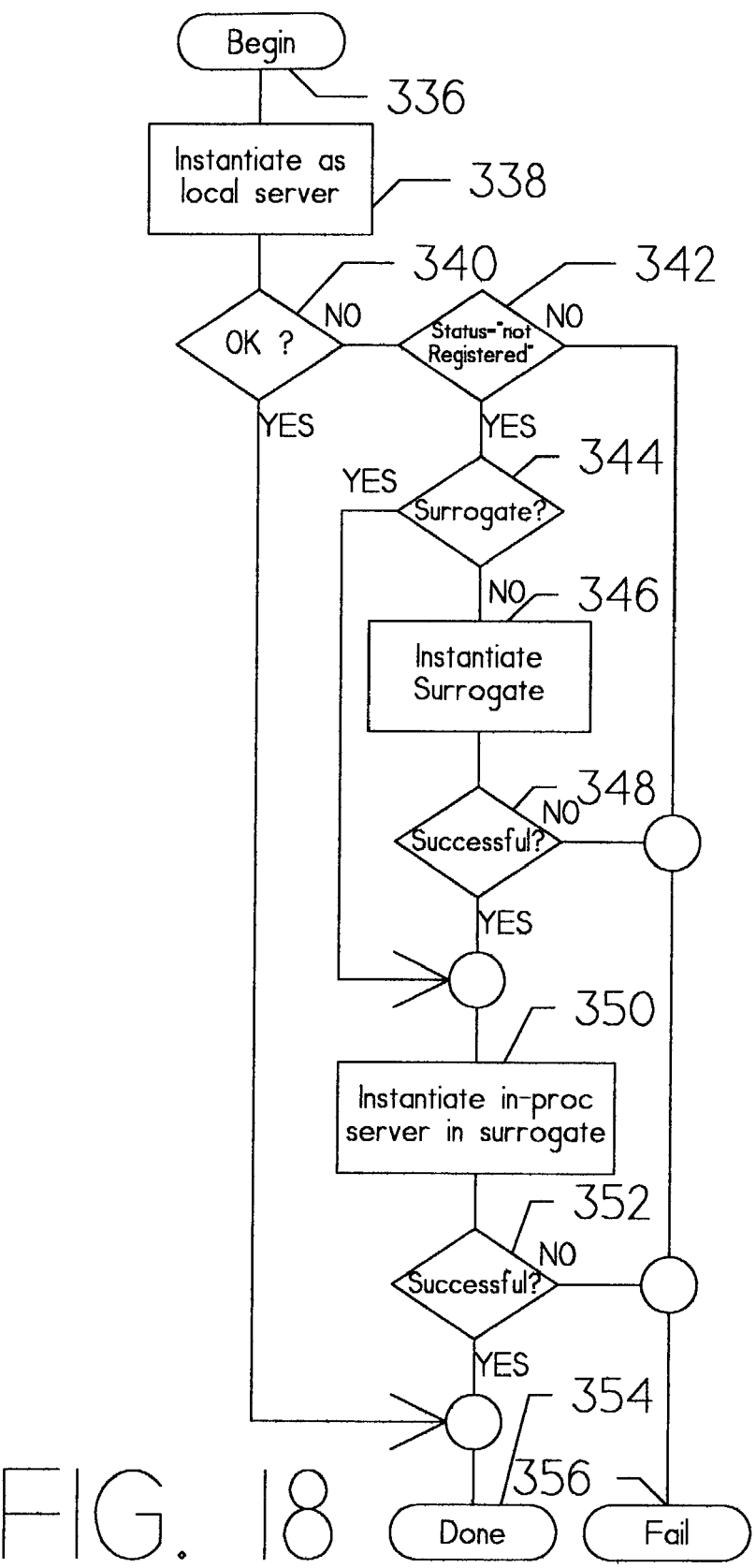
FIG. 18 is a detailed flow chart showing operation of the instantiation process.

FIG. 18 is a detailed flow chart showing the technique for instantiating a COM client in accordance with the preferred mode of the present invention. The process begins at element 336. The client attempts to instantiate the target server as a local server at element 338 and then interrogates the operation's status at element 340.

As explained above, local servers do not pose a risk to the calling client's program environment. Therefore, if instantiation as a local server was successful, control proceed immediately to element 354, and the client is ready to begin using the new server instance.

If instantiation was not successful, the client checks the operation's failure status at element 342 for a status of "not registered". If this is not the status value received, control is transferred immediately to element 356, and instantiation is considered to have failed.

If the status value at element 342 is "not registered", control progresses to element 344. This status value may indicate that the target server simply does not exist. However, it may also indicate that the target server is an in-process server only, and therefore could not be instantiated as a local server. At element 344, the client determines whether a surrogate process instance already exists. If one exists, control is transferred to element 350.

If at element 344, no surrogate is found to exist, the client attempts to instantiate a surrogate server at element 346. Note that the surrogate is always instantiated as a local server. At element 348, surrogate instantiation status is interrogated. If not successful, control is transferred immediately to element 356, and instantiation is considered to have failed.

If a surrogate instance was successfully instantiated, the client now attempts to instantiate the target server as an in-process server within the surrogate process at element 350. The operation's status is tested at element 352.

If successful, control is transferred to element 354 and the client may begin using the newly instantiated server. If not successful, control is transferred to element 356, and instantiation is considered to have failed Although the preferred mode of practicing the present invention is within the Cool ICE system available from Unisys Corporation, the technique is far more general purpose. It can be utilized, for example, with an object-based language, such as JavaScript. Because JavaScript is an object oriented language, the COM server instance could be implemented as a JavaScript object ("COMServer"), which has defined methods corresponding to the five operations necessary to implement a generic COM client:

COMServer.CreateInstance("prog-id");
COMServer.ReleaseInstance(c-server);
COMServer.InvokeMethod(c-value);
COMServer.GetProperty("property"); and
COMServer.PutProperty(c-value).

The COMServer object has a single user-visible Boolean property that indicates whether or not the object is currently associated with an instance of a COM server:

COMServer.Active

To handle argument, formal return, and property values, a helper object ("COMvalue") is also defined as an extension to the scripting engine. The object has three properties to specify the three essential attributes: COMValue.Type
COMValue.Direction
COMValue.Value

Having thus described the preferred embodiments of the present invention, those of skill in the art will be readily able to adapt the teachings found herein to yet other embodiments within the scope of the claims hereto attached.

We claim:

1. A method of protecting a software client from corruption of its memory space by a COM server comprising:
   a. generating a service request at a user terminal having a first operating system in accordance with action by a select user;
   b. transferring said service request from said user terminal via a publicly accessible digital data communication network;
   c. receiving said service request at a legacy data base management system having a second operating system which is not compatible with a COM environment from said publicly accessible digital data communication network and creating said software client;
   d. first instantiating a surrogate server by said software client;
   e. second instantiating said COM server by said surrogate server;
   f. determining whether said COM server is a registered in-process server; and
   g. inhibiting said first instantiating and said second instantiating if and only if said determining step determines that said COM server is not a registered in-process server.

2. A method according to claim 1 wherein said surrogate server further comprises a separate process.

3. A method according to claim 2 wherein said software client is located within said legacy data base management system.

4. An apparatus comprising:
   a. a user terminal having a first operating system which generates a service request whereby a select user is permitted to access certain data;
   b. a legacy data base management system having a second operating system responsively coupled to said user terminal via a publicly accessible digital data communication network;
   c. calling means located within said legacy data base management system for calling a COM server from a software client;
   d. first instantiating means responsively coupled to said calling means for instantiating a surrogate local server having a separate independent process;
   e. second instantiating means located within said surrogate local server and responsively coupled to a COM in-process server for instantiating said COM server from said surrogate local server; and
   f. means responsively coupled to said surrogate local server for inhibiting said first instantiating and said second instantiating if said COM in-process server is not a registered in-process server.

5. An apparatus according to claim 4 wherein said software client is located within said legacy data base management system.

6. An apparatus according to claim 5 wherein said legacy data base management system further comprises a commercial data base management system.

7. An apparatus according to claim 6 further comprising a second COM server responsively coupled to said software client.

* * * * *